United States Patent [19]

Mihos

[11] 3,978,534

[45] Sept. 7, 1976

[54] BEE FEEDER

[76] Inventor: Harry N. Mihos, 110 W. 3rd South, Salt Lake City, Utah 84110

[22] Filed: May 19, 1975

[21] Appl. No.: 578,399

[52] U.S. Cl. .................................................. 6/5
[51] Int. Cl.² ........................................ A01K 53/00
[58] Field of Search ................. 6/1, 5, 4 R, 4 A, 4 B

[56] References Cited
UNITED STATES PATENTS
1,607,659  11/1926  Will ........................................ 6/5 X FOREIGN PATENTS OR APPLICATIONS
1,252,990  3/1960  France .................................... 6/5
1,138,974  10/1962  Germany ............................... 6/5

Primary Examiner—Jack Q. Lever
Attorney, Agent, or Firm—Trask & Britt

[57] ABSTRACT

A bee feeder is mounted beneath the honey board and above the frames in a beehive. Access to the feeder is provided through an opening in the honey board so that food (e.g., syrup) may be introduced to the feeder after removing the outer cover (or roof) of the hive without disturbing the bees. The feeder is dimensioned to be contained within the honey board structure and presents fluid feeds at a trough along one or both edges of the feeder. The bottom of the feeder is sloped to direct fluids to the troughs.

6 Claims, 3 Drawing Figures

U.S. Patent  Sept. 7, 1976  3,978,534
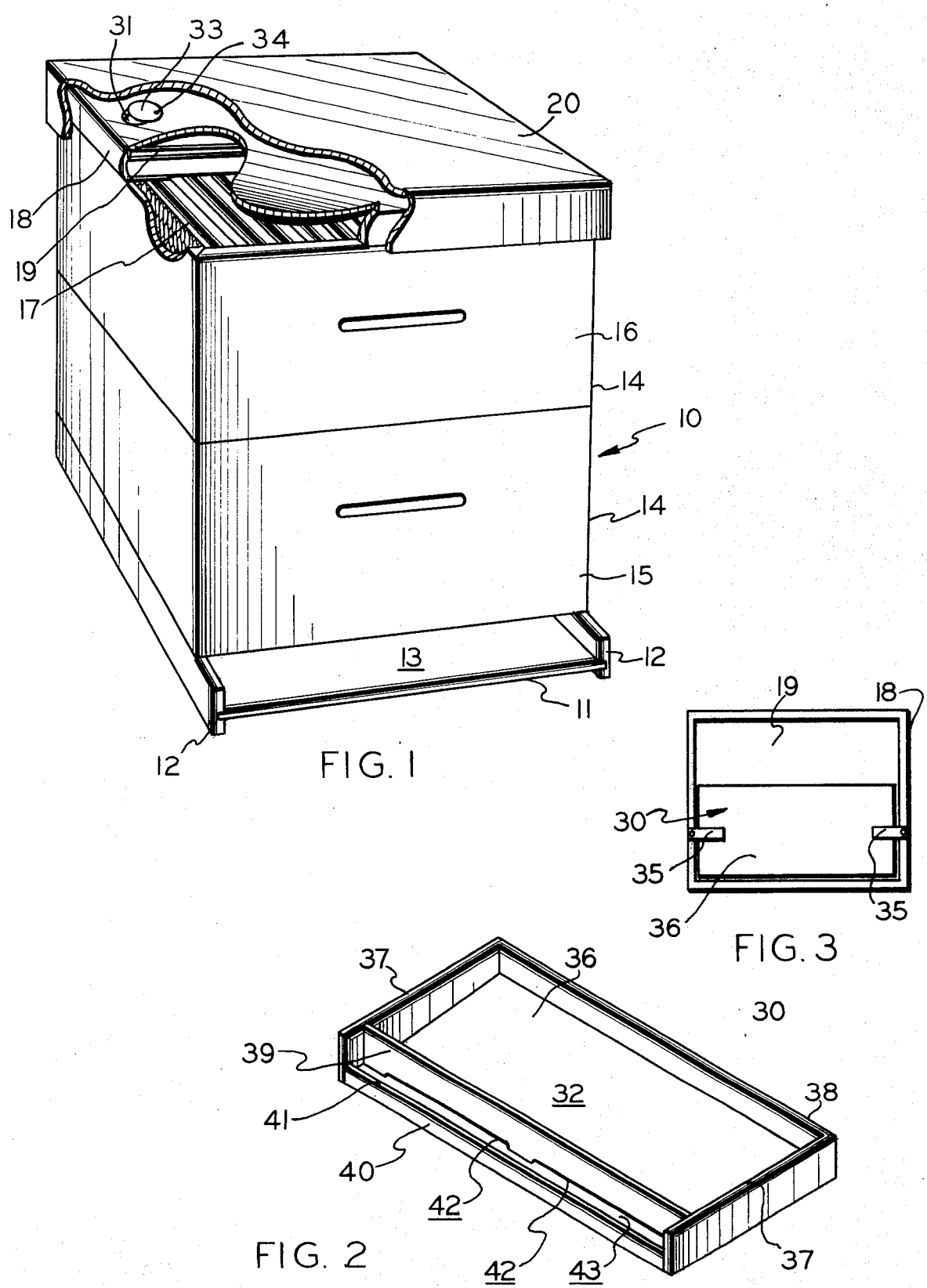

BEE FEEDER

BACKGROUND OF THE INVENTION

1. Field

This invention pertains to beekeeping and is particularly directed to an improved device and method for feeding bees within conventional apiary hives.

2. State of the Art

It has long been recognized that the productivity of a hive of bees bears a direct correlation to the population of the hive at the time nectar is available for gathering in the spring. Ordinarily, a bee colony controls its population in response to natural stimuli which inform the colony that it must either reduce population to conserve available food or increase its population to gather nectar from the surrounding fields. This population control is effected by the worker bees' reducing their brood rearing activities.

In nature, a bee colony will build up to full strength during the first portion of the honey flow (the period during which nectar is available for gathering) because it is during this period that food for the hive is available in abundance. The colony is relieved during this period from the necessity for sustaining itself from stored quantities of food. Skilled apiarists have thus developed techniques for "persuading" a colony that the honey flow is starting before the event so that the colony is artificially induced to increase its population substantially earlier than would otherwise be the case. In this fashion, a much greater number of worker bees is available to gather nectar from the fields when the honey flow commences.

Approximately three weeks are required from the laying of an egg by the queen bee to the development of a young worker bee, and approximately two additional weeks are required before the newly hatched worker bees are prepared to function as field bees. Accordingly, it is important from the standpoint of the productivity of the apiary to "convince" the colony that a honey flow is commencing at least several weeks prior to the anticipated event.

The technique which has developed for indicating the arrival of spring (or the commencement of a honey flow), involves feeding the colony. In practice, food, typically a simple sugar syrup, is offered to the worker bees within the hive, and those bees commence to gather and store this food in the storage section of the hive much as they would had they gathered nectar from the field. This activity serves the function of stimulating the hive to increase its brood rearing activities and serves the equally important function of maintaining morale within the hive so that the colony desires to gather the crop rather than to either swarm or rear a new queen. Swarming, or division of the colony through the rearing of a new queen, is stimulated in nature under circumstances where the colony believes food or nectar to be scarce. A disorganized or divided colony results in loss of harvest due to the distraction of the workers.

It is generally considered preferable to offer a sugar preparation such as fudge or syrup to the hive rather than raw honey from another hive. Such preparations avoid possible contamination by diseases carried by the alien honey. A number of feeding devices have been devised for this purpose, each of which has certain attendant disadvantages.

Examples of previous efforts at feeding a colony of bees may be found in U.S. Pat. Nos. 14,168; 821,246; 1,607,659; 2,193,741; and 2,567,871. An important negative aspect common to previous feeder devices adapted for location within the hive has been the necessity for disassembling portions of the hive in order to fill the feeder. It is fundamental in beekeeping, that the colony should be disturbed as little as possible, particularly during periods of severe winter temperatures. Moreover, introducing feed to the feeders known to the art is generally cumbersome and permits the attraction of robber bees. The use of a reservoir of feed located outside the hive, while avoiding the disturbance referred to hereinbefore, is especially disadvantageous from the standpoint of attracting robber bees or other pests.

SUMMARY OF THE INVENTION

The bee feeder of the present invention is constructed for mounting within the interior of the inner beehive cover so that it does not interfere or interact with any of the other structure, notably the frames, comprising the hive. The feeder includes a bottom and peripheral side walls which define a pan-like reservoir with one edge slightly lower in profile. This adge defines a lip which permits access to the contents of the pan. According to some embodiments, two opposite edges are thus reduced in profile to permit access from both sides to the contents of the reservoir. The top of the reservoir, which may be completely open, is held snuggly against the bottom surface of the honey board (the honey board comprises the top of the inner cover) so that the reservoir itself is completely enclosed except for access slots defined by the honey board and the aforementioned lips defined by the side edges of the reservoir. A filling port is provided through the honey board so that syrup (or other fluid food substance) may be introduced to the reservoir without disturbing the interior of the hive.

The bottom of the reservoir may be sloped to encourage flow of syrup towards the feeding region (outer edges) of the reservoir. The feeding region comprises a trough, or if desired, a pair of troughs. Each trough is defined by the side edge of reduced profile (which defines a trough lip) and an interior baffle plate. The baffle plate serves as a barrier to exclude bees from the interior of the trough while still permitting the flow of feed into the trough. In this fashion, the trough permits feeding by the bees yet prevents their coming in total contact with the syrup at their peril. If the bees had unlimited access to syrup, many would become mired in the reservoir and perish.

BRIEF DESCRIPTION OF THE DRAWINGS

In the drawings, which illustrate what is presently regarded as the best mode for carrying out the invention, FIG. 1 is a perspective view of a beehive partially cut away to illustrate the component of the hive with the feeder of this invention installed.

FIG. 2 is a pictorial view of a bee feeder of this invention looking into its open top.

FIG. 3 is a plan view from the bottom of the feeder of this invention installed in the inner cover of the hive as illustrated by FIG. 1.

DESCRIPTION OF THE ILLUSTRATED EMBODIMENT

As illustrated by FIG. 1, a modern beehive 10 conventionally includes a bottom board or floor 11 held by side supports 12 to define an entrance 13 into the hive 10. The hive may include several stories 14, the lower most one 15 of which is customarily referred as the brood chamber or body. The upper stories 16 are commonly referred to as storage rooms or supers. Both the body 15 and supers 16 are provided with conventional removable frames 17. An inner cover 18 is mounted atop the upper story above the frames 17 and includes a honey board 19 which covers and seals the hive. The entire hive is covered with an outer cover or roof 20. A colony of bees housed within the hive 10 generally seals all of the structural elements of the hive including all of the cracks separating the various stories of the hive, the frames and the inner cover with propolis, a gummy substance gathered by the bees. Thus, only the outer cover or roof 20 is ordinarily easily removable from the hive without the assistance of a hive tool or other device to break the seals.

The feeder of this invention may be embodied in various forms, a preferred embodiment being illustrated by FIG. 2. As may be seen from the other figures of the drawing, the feeder 30 is installed entirely within the inner cover 18 of the hive in the space immediately above the frame 17 with its open top mounted flush against the honey board 19. The honey board 19 may be regarded as a closure member of the feeder. A hole 31 is bored through the honey board 19 to communicate with the interior (reservoir chamber) 32 of the feeder 30. This hole is provided with a cover plate 33 which may be pivoted on a pin 34 to selectively open or close the hole 31. In the form illustrated, the feeder 30 is easly mounted within the inner cover by means of tabs 35 which extend from the bottom 36 of the feeder 30.

The feeder itself comprises the bottom plate 36, two end walls 37, a first side wall 38, barrier plate 39 and a second side wall of lower profile 40 which defines a spill guard lip 41. When mounted within the inner cover, the upper edges of the end walls 37, side wall 38 and barrier plate 39 fit snuggly against the honey board 19 to prevent bees from squeezing between the honey board and the feeder to gain entry into the reservoir 32. Openings 42 are provided at the base of the barrier plate 39 to permit flow of fluid feed material (such as simple syrup) into a trough region 43 wherein it is distributed throughout substantially the entire trough. The lip 41 is spaced from the bottom of the honey board 19 and the inside walls of the hive 10 sufficiently to permit access of a bee to the interior of the trough 43. The trough 43 provides ample access for bees to the food provided, without providing opportunities for the bees to become entrapped in the typically sticky feed. The openings 42 are of sufficiently small height to effectively exclude feeding bees from the interior of the reservoir 32.

Although the feeders of this invention may be embodied in various sizes and shapes, it is preferred that the feeder extend substantially the entire width of the honey board 19 as illustrated. The embodiment shown includes a single trough 43 at one side of the feeder 30, but it will be understood that troughs may be provided at opposite sides of the reservoir. The bottom plate 36 preferably slopes as shown toward the trough to encourage complete emptying of the reservoir 32.

A significant aspect of the present invention is that the feeders of this invention may be mass-produced in relatively few standard sizes to fit within the inner covers 18 of almost any commonly used beehive. Modern apiarists utilize almost exclusively hives of the movable frame type. Although many modifications of this basic hive type are in use, they are generally standarized in size and shape.

In use, the outer cover 20 is removed from the hive 10, the cover plate 33 is pivoted to expose the hole 31 and simple sugar syrup or other fluid feed material is poured into the reservoir 32 through the hole 31. Proper feeding routine for encouraging increased brood activists requires periodic and frequent feedings of controlled quantities. In other instances, feeding on a regular basis is required merely because the hives have an insufficient store of honey to maintain the population through a period of bad weather or following a short season. In any event, an important advantage of the present invention is the ability to provide fluid feeds to the colony without in any way disturbing the bees and without exposing a store of the feeding material to either robber bees or other pests. Moreover, it is particularly important that while the feed apparatus is completely isolated from the weather and other interference, the structural integrity of the hive is in no way disturbed. That is, the propolis seal effected by the bees is completely undisturbed.

Although the invention has been described herein by reference to details of certain illustrated embodiments, such reference is not intended to limit the scope of the appended claims which themselves recite those features regarded as definitive of the invention.

I claim:
1. Feeding apparatus for mounting in a beehive beneath the roof of the hive and directly above frames suspended therein, comprising:
   a. a honey board member constituting a ceiling for the hive and provided with an access port which opens into the space immediately above the frames when said honey board is in position atop the hive;
   b. a reservoir chamber mounted to the underside of said honey board so that when the honey board is in position atop the hive, the reservoir will extend substantially the entire width of the hive across the frames, said reservoir constituting means for receiving fluid substances introduced through said access port; and
   c. a feeding trough with a bottom and a spill guard lip both approximately parallel the upper side of said honey board such that when the honey board is in position atop the hive, said lip is spaced from the honey board and the walls of the hive sufficiently to permit access of a bee to the interior of the trough, said trough extending substantially the entire width of the hive and being connected to said reservoir to receive fluid substances therefrom for distribution throughout substantially the entire trough.
2. Apparatus according to claim 1, wherein said reservoir includes a bottom member sloped in the direction of said trough so that fluid substances introduced to said reservoir tend to drain substantially completely from said reservoir to said trough.
3. Apparatus according to claim 2 including similar feeding troughs on opposite sides of said reservoir and integral therewith wherein said bottom member slopes from an interior location in the direction of each trough so that the contents of the reservoir tend to drain substantially equally to both troughs.
4. Apparatus according to claim 1 including a cover member for said access port mounted atop said honey board in movable relation so that it may be selectively positioned over said port or removed therefrom.

5. Apparatus according to claim 4 wherein said trough is integral with said reservoir and said reservoir includes a bottom member sloped downward with respect to said honey board in the direction of said trough.

6. Apparatus according to claim 4 including a barrier member approximately parallel said spill guard constituting means for restraining bees from physically entering into said reservoir and defining with said spill guard said feeding trough.

* * * * *